US012299027B2

(12) United States Patent
Alston et al.

(10) Patent No.: US 12,299,027 B2
(45) Date of Patent: May 13, 2025

(54) EMOJI RECOMMENDATION SYSTEM

(71) Applicant: DISCORD INC., San Francisco, CA (US)

(72) Inventors: Cameron Alston, Seattle, WA (US); Tristan Cossio, San Francisco, CA (US); Shuyu Luo, Belmont, CA (US); Arin Schwartz, San Francisco, CA (US); Ken Soong, Redwood City, CA (US)

(73) Assignee: DISCORD INC., San Francisco, CA (US)

( * ) Notice: Subject to any disclaimer, the term of this patent is extended or adjusted under 35 U.S.C. 154(b) by 0 days.

(21) Appl. No.: 18/191,806

(22) Filed: Mar. 28, 2023

(65) Prior Publication Data

US 2024/0330354 A1 Oct. 3, 2024

(51) Int. Cl.
*G06F 16/00* (2019.01)
*G06F 16/2457* (2019.01)
*G06F 16/438* (2019.01)

(52) U.S. Cl.
CPC ...... *G06F 16/438* (2019.01); *G06F 16/24578* (2019.01)

(58) Field of Classification Search
CPC .................................................. G06F 16/24578
See application file for complete search history.

(56) References Cited

U.S. PATENT DOCUMENTS

| 2016/0292148 | A1* | 10/2016 | Aley | G06F 40/274 |
| 2017/0052946 | A1* | 2/2017 | Gu | G06F 40/274 |
| 2019/0034412 | A1* | 1/2019 | Gupta | G06F 40/279 |

* cited by examiner

*Primary Examiner* — Ajith Jacob
(74) *Attorney, Agent, or Firm* — Polsinelli

(57) ABSTRACT

The present technology provides an emoji recommendation service that measures a similarity score between a global emoji embedding space of an online community with a user embedding space generated from the global emoji embedding space and generates a ranking of top emojis based on the measured similarity score. The emoji recommendation service further measures an averaged ranking of top emojis based on the similarity score and term frequency scores in the online community. The emoji recommendation service trains a machine learning algorithm to arrange vectors representing emojis in the global emoji embedding space.

20 Claims, 9 Drawing Sheets

EMOJI RECOMMENDATION SYSTEM

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Emojis are a popular form of content that is regularly finding use by users of social networks. Users now have a large library of emojis to choose from when generating content. While social networks can provide entertainment, networking, commercial, or informational value, they are also subject to various challenges.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
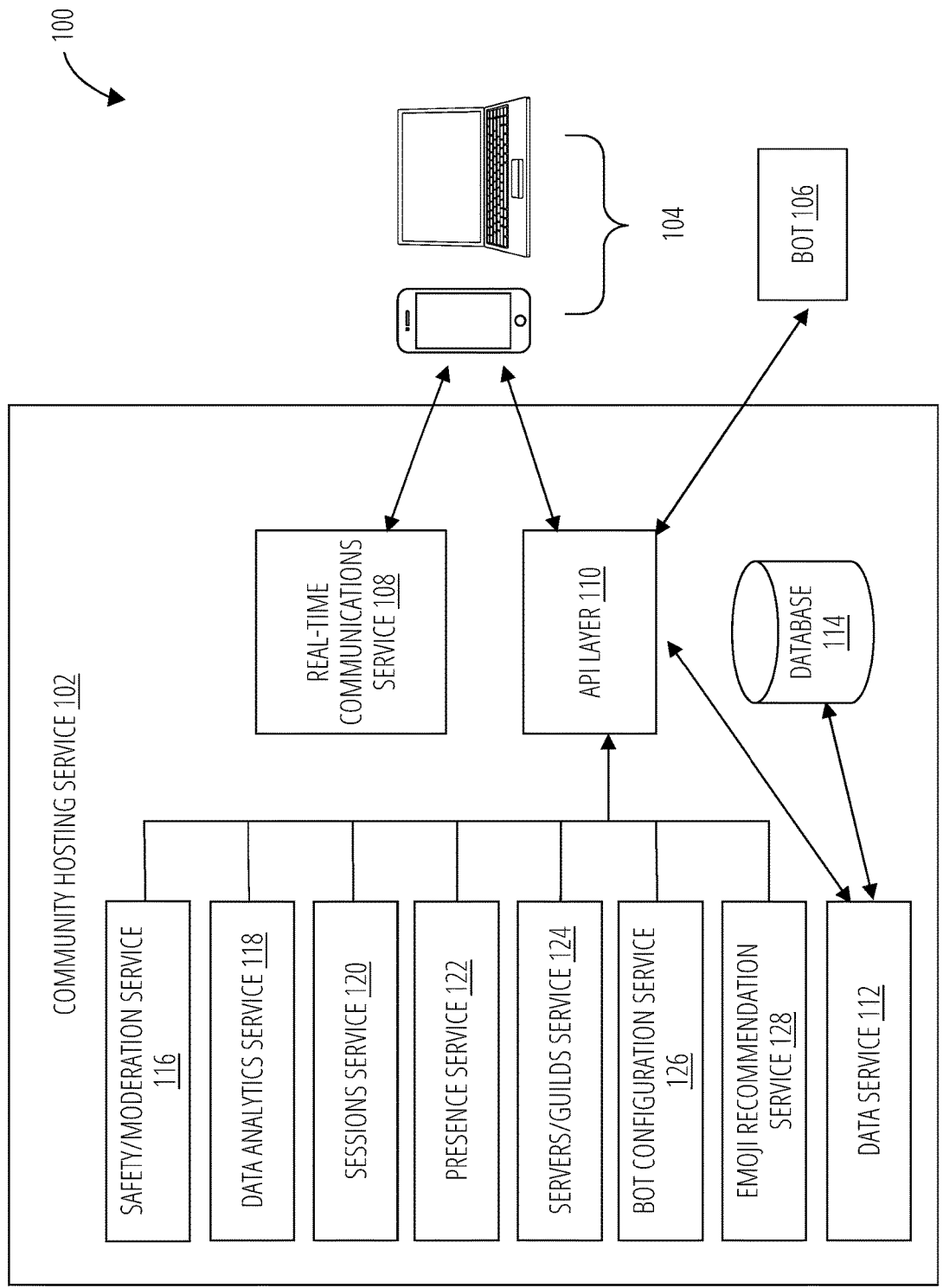
FIG. 1 illustrates an example system configured to support user accounts in creating, managing and participating in online communities in accordance with some aspects of the present technology.

Various embodiments of the disclosure are discussed in detail below. While specific implementations are discussed, it should be understood that this is for illustration purposes only. A person skilled in the relevant art will recognize that other components and configurations may be used without parting from the spirit and scope of the disclosure.

Additional features and advantages of the disclosure will be set forth in the description which follows, and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practicing the principles set forth herein.

As the number of available emojis including custom emojis increases, finding the right emoji to type with any given message may end up being an annoyance for users. Accordingly, social networking platforms need to invest in technologies that alleviate the time it would take to pick out an appropriate emoji. Additionally, users generate a large amount of data. Therefore, social networks may use such emoji usage data to learn from their users and create custom recommendations based on their past usage.

The disclosed technology addresses the need in the art for utilizing past emoji usage at a server level and at a user level to inform machine learning models to output embedding spaces with vectors that represent emojis used to determine a ranking for top emojis for a respective user in a respective server. Embedding spaces are sometimes used to place representations of objects (e.g., emojis) that are more similar close together and objects that are less similar farther apart. The present technology can recommend top emojis for a user based on personal preferences and the preferences of others in the same server. The present technology can provide different recommendations for different users in the same server as well as different recommendations for the same user in different servers.

With emojis being ubiquitous across most communication systems, finding the right emoji to use in a given situation can be difficult. As a result, users tend to concentrate usage on a narrow set of "popular" emojis, or the last few emojis that they used. However, users would benefit from a more diverse set of emojis to use emojis that fit in the context of the discussion, or allow the user to uniquely express themselves. But when there is too many emojis to choose from, users may experience choice overload. More specifically, user would benefit from a system that recommends emojis, as well as custom emojis created by users (i.e., non-Unicode emojis), based on the audience of the conversation. With each server having its unique set of interests and its own language, just like how different friend groups speak differently and use different terms, emoji usage may also be different between servers.

In a more concrete example, on a community hosting service (a type of social network platform), millions of different emojis may be used in different servers. Past emojis used by users in the different servers over the period of time may be used to create different global emoji embedding spaces for each server. Furthermore, each user may have their own user embeddings that are generated from the global emoji embedding spaces for each server. User embeddings may be formed by calculating a weighted average based on frequency of use in the past number days for a particular user, and the weighted average may shift or translate particular global emoji embeddings that the particular user tends to use more. A similarity score may then be calculated between the global emoji embeddings of the server and the user embeddings. A first ranking of top emojis may then be generated for a particular user in a particular server.

In parallel, term frequency-inverse document frequency (tf-idf) scores of a specific emoji for a specific user and other users of a shared server may be determined. The tf-idf scores may be calculated as a product of a term frequency calculation, which takes a log of a number users that send a specific emoji divided by a total number of users that send any emoji in the online community over the period of time, and a user inverse document frequency calculation, which takes a log of a total number of times of any emojis is sent by the user divided by a number of the times the specific emoji is sent by the user over the period of time. Using the tf-idf scores, a second ranking of top emojis for the particular may be generated, and a final ranking may be an average of the first ranking and the second ranking.

An additional aspect of the present technology is to replace Unicode emojis with custom emojis associated with the respective server. Custom emojis may be generated based on images or GIFs uploaded by users. In some embodiments, the present technology uses a highest similarity score between a vector representing a Unicode emoji and a vector representing a custom emoji in shared embedding space. In some examples, if a server is dedicated to hiking, recommended emojis may include hiking-themed emojis rather than the closest similar Unicode emojis.

An additional aspect of the present technology is to recommend user-generated or custom emojis based on draft messages so that related emojis may be used along with messages sent in channels of the server. When users are drafting a message and there is a related emoji that would fit in the message, users may appreciate being recommended such an emoji to add to their message. For example, vectors representing words and vectors representing emojis may be embedded in a shared embedding space. One or more words of the draft message may be used for determining which emojis to recommend. One or more vectors associated with one or more words may be used to determine which one or more vectors associated with emojis have the highest similarity score. The top emojis may then be recommended to a user drafting a message for the user to add the emoji to their message.

Accordingly, the present technology allows the community hosting service to create emoji-based embedding spaces, which allows for better conclusions regarding emojis and better management of the community hosting service. As such, one particular aspect of the present technology is that it is used to improve the user experience of its users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as data collection and/or use changes.

Although the present disclosure broadly covers the use of personal information data to implement one or more various disclosed embodiments, the present disclosure also contemplates that the various embodiments can also be implemented without the need for accessing such personal information data. The various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bot 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bot.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application 104 can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot configuration service 126 for creating and/or configuring one or more bot 106. The bot configuration service 126 can provide tools and template configurations to configure bots to take on a variety or roles within a channel of a server. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bot 106 can have their own user account and is authenticated using a token. Bot 106 can have full access to all services of community hosting service 102.

FIG. 1 also illustrates an emoji recommendation service 128 for generating a ranking of emojis for a particular user in a particular server. The emoji recommendation service 128 can provide top ranked emojis to users when they are drafting messages at the server to be added to their messages. The ranking of the emojis may be determined based on a similarity score between a global emoji embedding space of an online community (i.e., one of the servers) with a user embedding space generated from the global emoji embedding space and generating a ranking of top emojis based on the measured similarity score in accordance with some aspects of the present technology. Furthermore, the global emoji embeddings may be created in an embedding space. The global emoji embeddings may comprise vectors representing past emoji usage by users in an online community over a period of time. In some cases, the emoji recommendation service 128 may be a part of or interfaces with the servers/guilds service 124.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
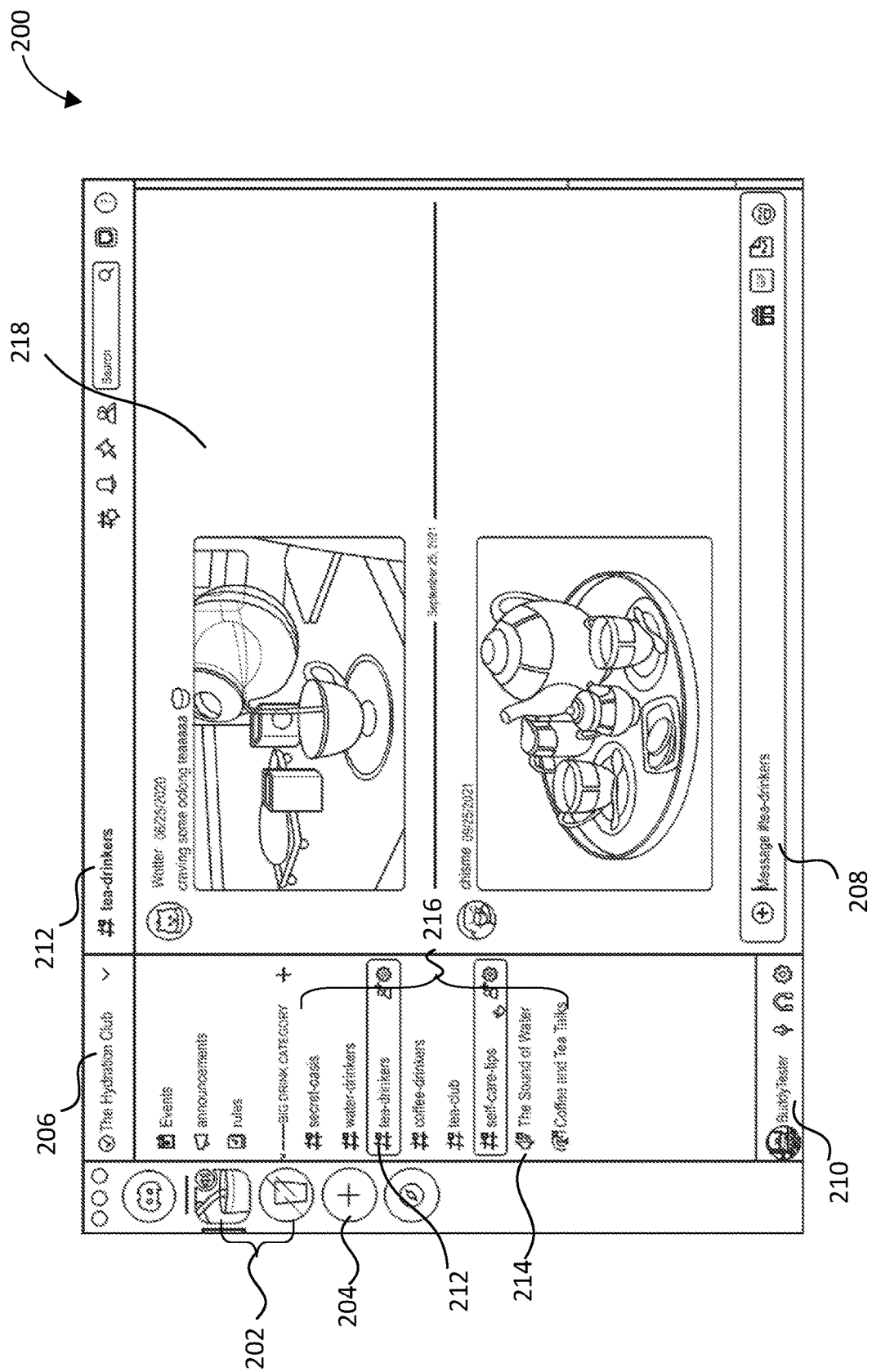
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes an options 214 that are part of the server hydration club server. options 214, entitled "tea drinkers", is a non-real-time messaging channel. The message thread within the "tea drinkers" channel can be shown within options 214. As illustrated in FIG. 2A, the options 214 is configured to present content such as text messages, images, emojis, recorded voice or video files, attachments, etc. A user can provide content to be included in the channel using input interface 208. The server 202 includes options 214 entitled "sound of water" as further described in FIG. 2B.

User interface 200 also includes a selectable option 204 to add additional servers. User interface 200 also includes a user account icon and controls 210.

Figure 2B:
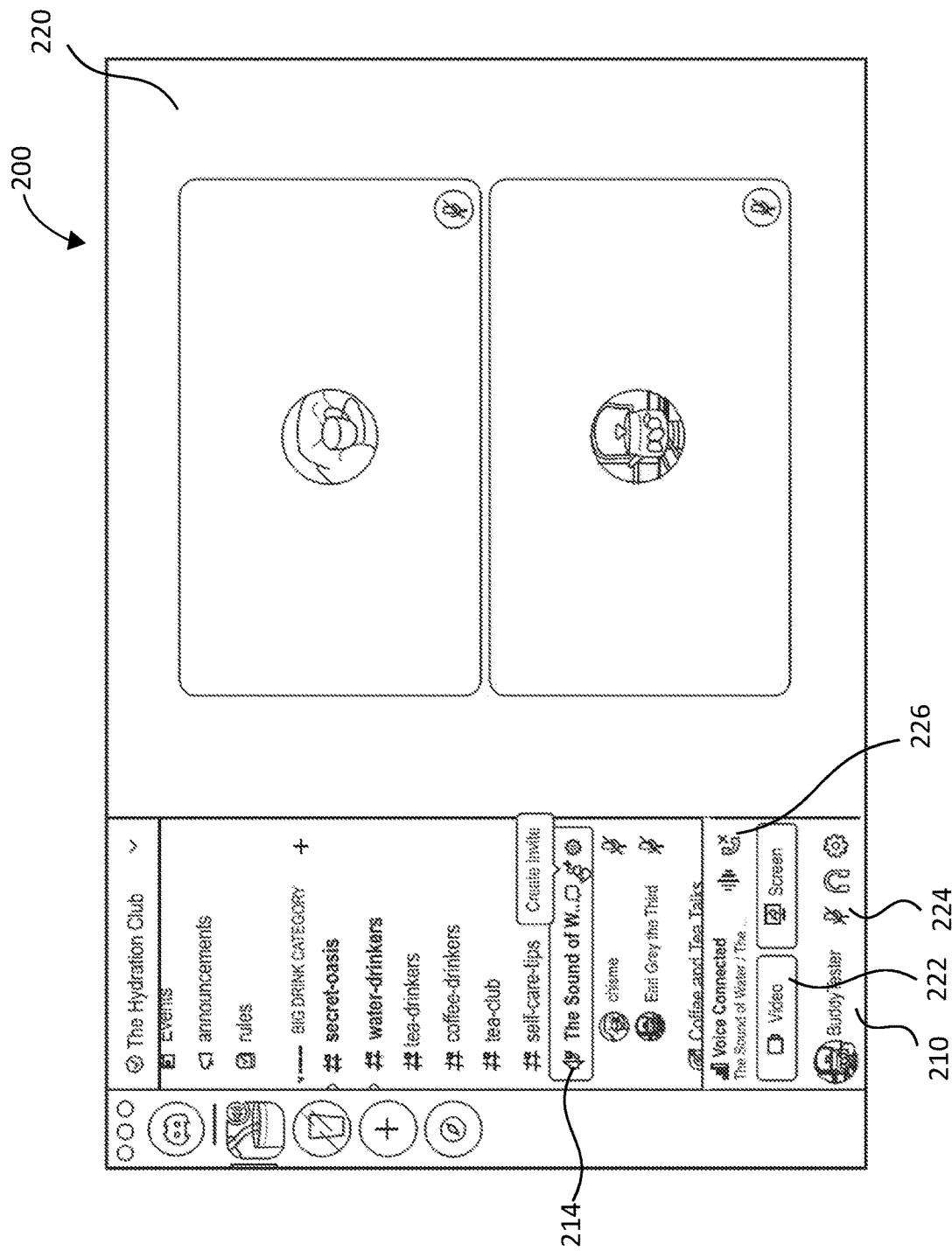
FIG. 2B illustrates an example of a user interface presented by a client application in accordance with some aspects of the present technology.

FIG. 2B illustrates another example of user interface 200 presented by client application 104. In FIG. 2B, channel 214 entitled "sound of water" has been selected. The "sound of water" channel is a real-time communications channel. Accordingly, messaging pane 212 shows two user accounts engaged in real-time communications. As illustrated in FIG. 2B, the user account icon and controls 210 show that the user account's microphone 216 is muted. Additionally, the user account has option 218 or option 220 to share their video or screen, respectively. The user account can also disconnect from the real-time communications using option 222.

Figure 3:
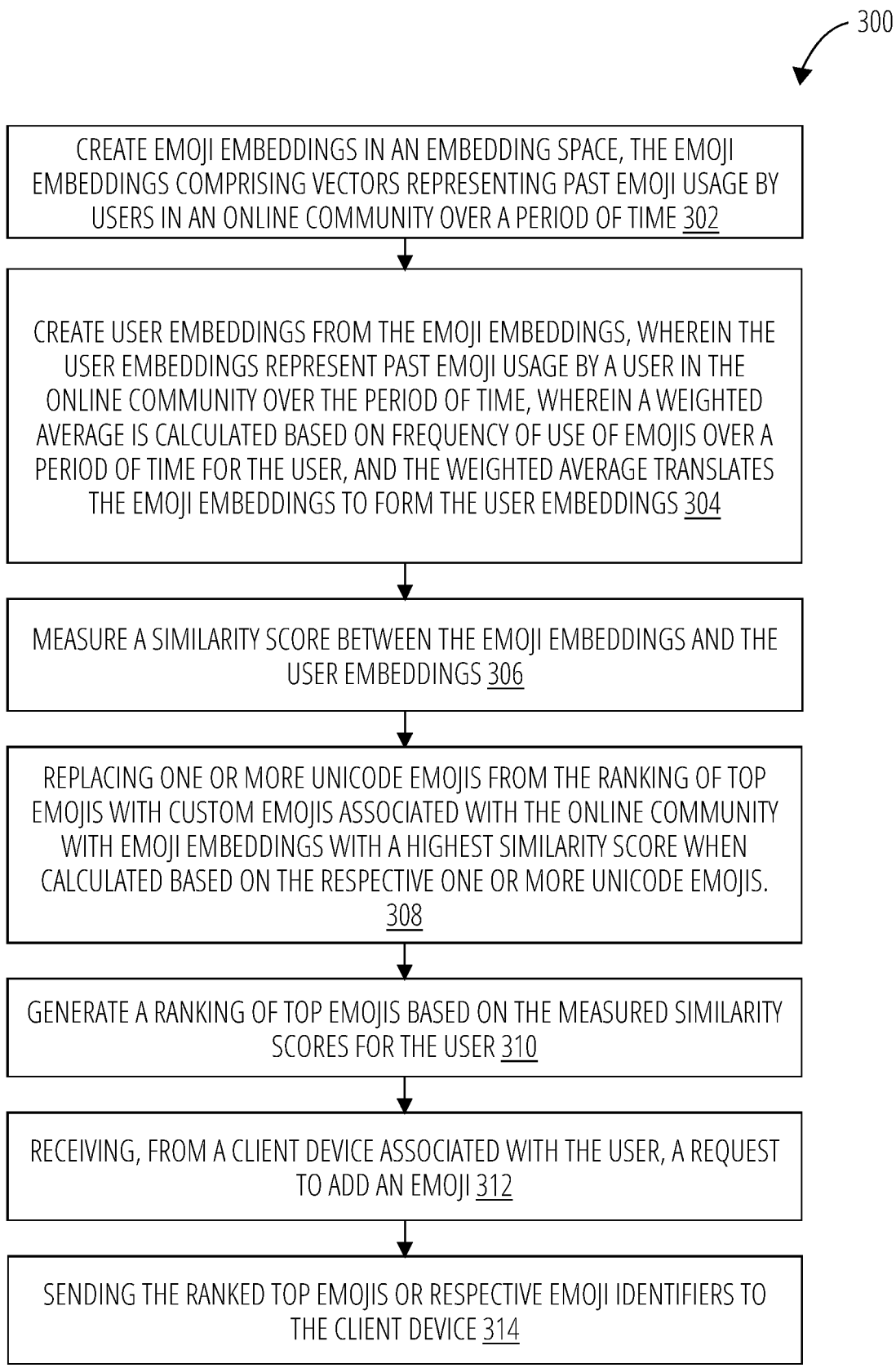
FIG. 3 illustrates an example method for measuring a similarity score between a global emoji embedding space of an online community with a user embedding space generated from the global emoji embedding space and generating a ranking of top emojis based on the measured similarity score in accordance with some aspects of the present technology.

FIG. 3 illustrates an example method 300 for measuring a similarity score between a global emoji embedding space of an online community (i.e., one of the servers 202) with a user embedding space generated from the global emoji embedding space and generating a ranking of top emojis based on the measured similarity score in accordance with some aspects of the present technology. In step 302, global emoji embeddings may be created in an embedding space. The global emoji embeddings may comprises vectors representing past emoji usage by users in an online community over a period of time. As such, prior to creating the global emoji embeddings, past emoji usage may be collected over the period of time and tagged with metadata including timestamps, user ID for the user that used the emoji, server ID for which server the emoji was used in, and in some cases, message ID that links the emoji to the message it was sent with.

For example, the global emoji embeddings may be a mathematical representation with a certain dimension, such as a 50-dimensional vectors, to represent which emojis the users of the online community have been using over a period of time. The period of time may be a couple of weeks, as an example, and the global emoji embedding space may be updated after the period of time for a refreshed set of global emoji embeddings that are an up-to-date representation of what the recent emoji usage has been for the online community. In some cases, the emoji recommendation service 128 illustrated in FIG. 1 may create the global emoji embeddings in the embedding space.

In step 304, user embeddings may be created from the global emoji embeddings. The user embeddings may represent past emoji usage by a user in the online community over the period of time. User embeddings are mathematical representation with a same dimension, such as a 50-dimensional vectors, as the global emoji embeddings, since they are generated from the global emoji embeddings. In some cases, a weighted average may be calculated based on frequency of use of emojis over a period of time for the user, and the weighted average may shift or translate the global emoji embeddings to form the user embeddings. In some cases, the emoji recommendation service 128 and/or the servers/guilds service 124 illustrated in FIG. 1 may create the user embeddings from the global emoji embeddings.

For example, if global emoji embeddings of a particular server dedicated to doctors includes vectors representing emojis for all of the emojis that were used in the period of time, and a brain emoji was used in the period of time, a vector representing the brain emoji would be represented in the global emoji embeddings. For a user embedding for a particular user in that server, past emoji usage data by the particular user in that server is used to determine which vectors may shift or translate. Following this example, if this user used the brain emoji X times less than an average user uses the brain emoji in the server in the period of time, the vector representing the brain emoji in the user embedding may be shifted or translated based on a weighted average to form the user embeddings.

In step 306, a similarity score may be measured between the global emoji embeddings and the user embeddings. Each individual user has one single user embedding, which presents the past overall emojis usage for this user (weighted average of emoji embeddings based on emojis they have used in past X days). That means for a user, the similarity scores is obtained by calculating cosine similarities between this one user embedding and all available emoji embeddings. Following the previous example, if users on the server dedicated to doctors are using the brain emoji X times more than this particular user, the similarity score may be lower. As such, the brain emoji may not rank highly. However, when there is more of an alignment between how the user uses various emojis and how the other users use similar emojis, then the respective rankings for such emojis would be higher. It follows that if an emoji is "part of the language" of a particular server, the similarity score should be higher for such emojis. In some cases, the emoji recommendation service 128 and/or the servers/guilds service 124 illustrated in FIG. 1 may measure the similarity score between the global emoji embeddings and the user embeddings.

In step 308, a ranking of top emojis may be generated based on the measured similarity scores for the user. A ranking of top emojis may be used to recommend a set of emojis to the user when they are drafting messages at a channel of the server. In some cases, the emoji recommendation service 128 and/or the servers/guilds service 124 illustrated in FIG. 1 may generate the ranking of top emojis.

Figure 4:
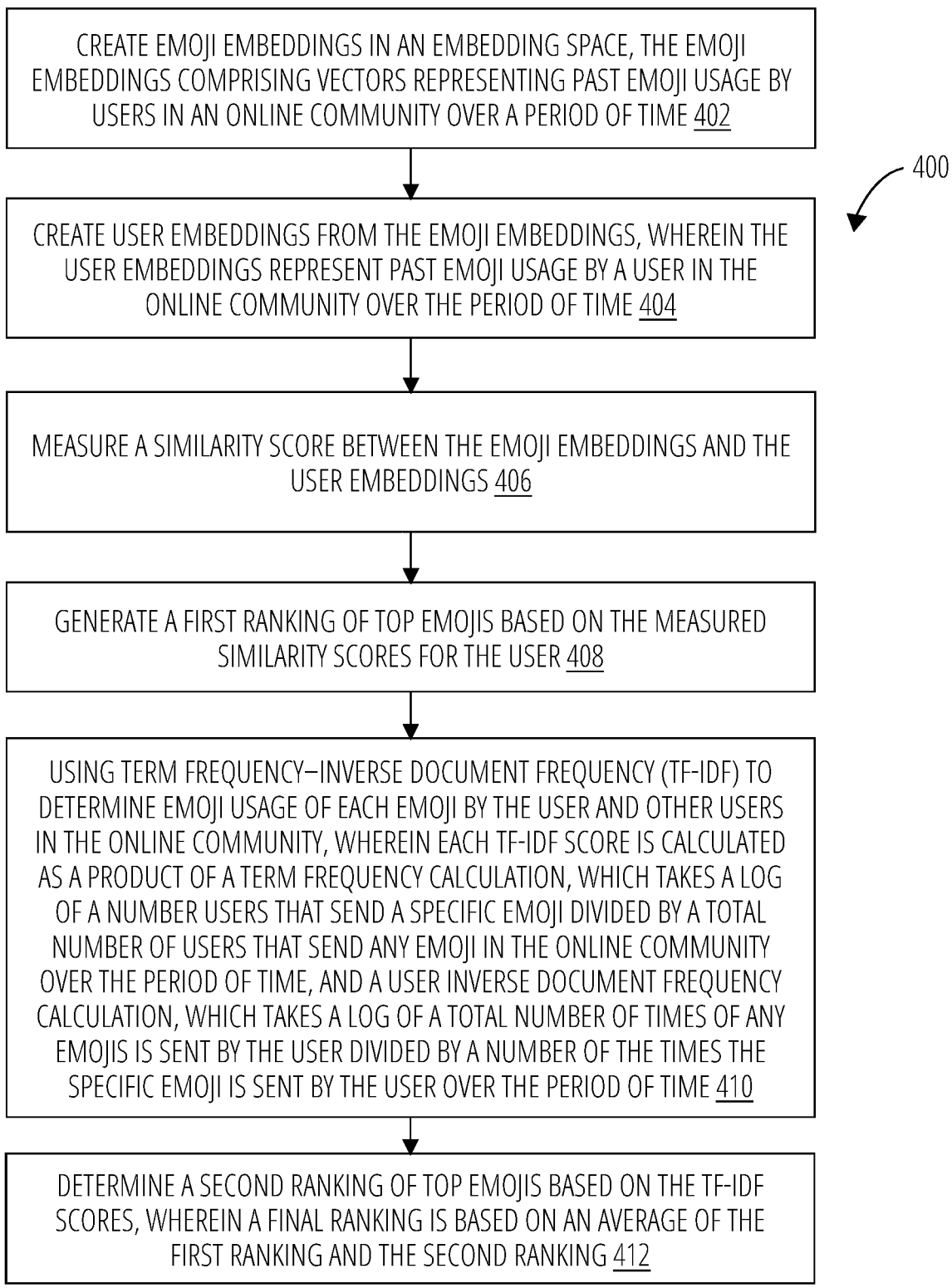
FIG. 4 illustrates an example method for measuring an averaged ranking of top emojis based on the similarity score and term frequency scores in the online community in accordance with some aspects of the present technology.

FIG. 4 illustrates an example method 400 for measuring an averaged ranking of top emojis based on the similarity score and term frequency scores in the online community in accordance with one embodiment. In step 402, global emoji embeddings may be created in an embedding space. In some cases, the global emoji embeddings may comprise vectors representing past emoji usage by users in an online community over a period of time. In some cases, the emoji recommendation service 128, the data analytics service 118, and/or the servers/guilds service 124 illustrated in FIG. 1 may create the global emoji embeddings in the embedding space.

In step 404, user embeddings may be created from the global emoji embeddings. The user embeddings may represent past emoji usage by a user in the online community over the period of time. In some cases, user embeddings may be modified global emoji embeddings. The modifications may be attributable to frequency of usage of certain emojis by the user in the online community. In some cases, the emoji recommendation service 128, the data analytics service 118, and/or the servers/guilds service 124 illustrated in FIG. 1 may create the user embeddings.

In step 406, a similarity score between vectors of the global emoji embeddings and the user embeddings are measured. Measuring the similarity score, such as using a cosine similarity measure, may provide different similarity scores for different emojis. In some cases, a higher similarity score indicates a closer alignment between the global emoji embeddings and the user embeddings, and a higher likelihood that the user would use that emoji. In some cases, the emoji recommendation service 128, the data analytics service 118, and/or the servers/guilds service 124 illustrated in FIG. 1 may measure the similarity score between vectors of the global emoji embeddings and the user embeddings.

In step 408, a first ranking of top emojis may be generated based on the measured similarity scores for the user. The first ranking may be an initial ranking that is used to determine a final ranking. In some cases, the emoji recommendation service 128, the data analytics service 118, and/or the servers/guilds service 124 illustrated in FIG. 1 may generate the first ranking of top emojis based on the measured similarity scores for the user.

In step 410, term frequency-inverse document frequency (tf-idf) is used to determine emoji usage of each emoji by the user and other users in the online community. Each tf-idf score is calculated as a product of a term frequency calculation, which takes a log of a number users that send a specific emoji divided by a total number of users that send any emoji in the online community over the period of time, and a user inverse document frequency calculation, which takes a log of a total number of times of any emojis is sent by the user divided by a number of the times the specific emoji is sent by the user over the period of time. In some cases, a high score from the term frequency calculation may indicate that a lot of users are using the specific emoji in the server, and the specific emoji is popular. In some cases, a high score from the user inverse document frequency calculation may indicate that that this user uses this specific emoji a lot. In some cases, the emoji recommendation service 128, the data analytics service 118, and/or the servers/guilds service 124 illustrated in FIG. 1 may determine emoji usage using tf-idf and calculate the tf-idf scores.

In step 412, a second ranking of top emojis based on the term frequency scores may be determined such that a final ranking is based on an average of the first ranking and the second ranking. The averaging of the rankings may be a weighted average of the rankings such that either the first ranking or the second ranking may be weighted higher or lower when determining the final ranking. In some cases, the emoji recommendation service 128, the data analytics service 118, and/or the servers/guilds service 124 illustrated in FIG. 1 may determine the final ranking based on the average of the first ranking and the second ranking.

Figure 5:
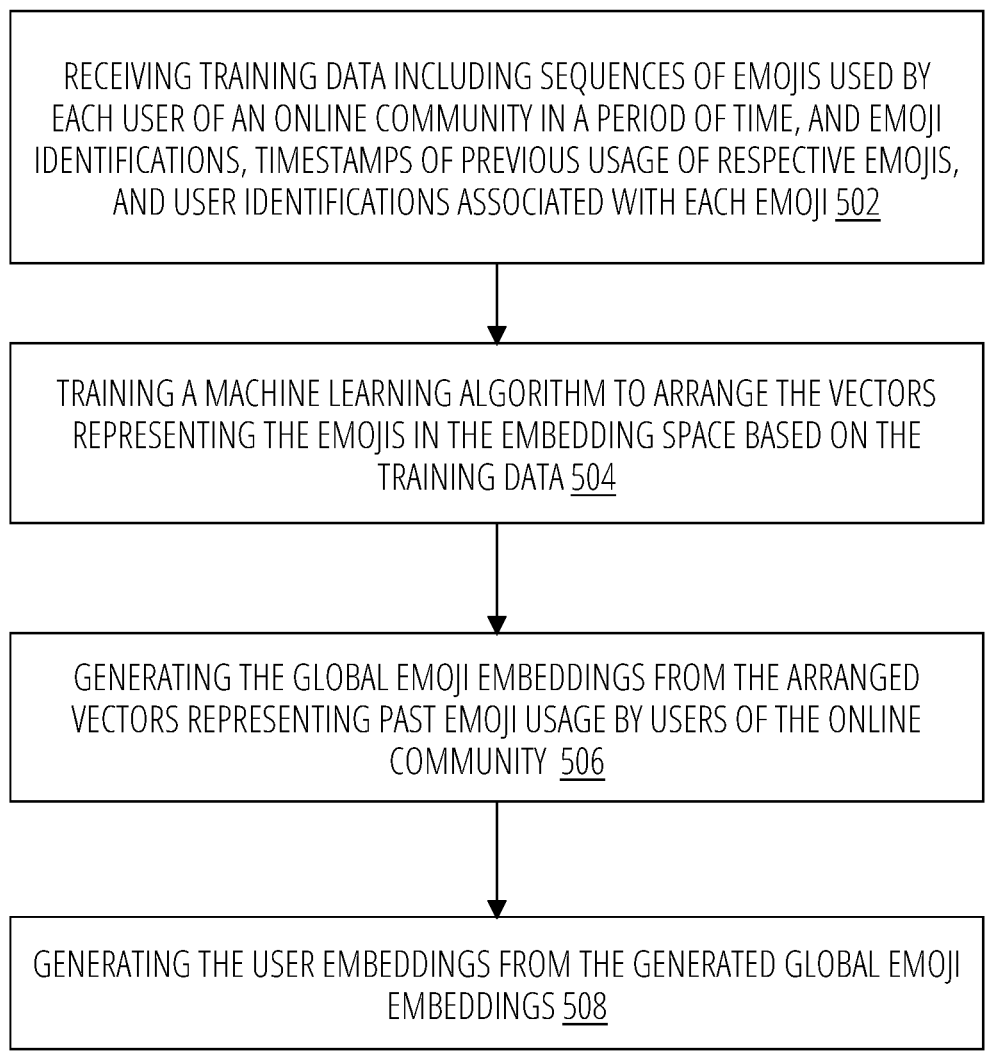
FIG. 5 illustrates an example method for training a machine learning algorithm to arrange vectors representing emojis in the global emoji embedding space in accordance with some aspects of the present technology.

FIG. 5 illustrates an example method 500 for training a machine learning algorithm to arrange vectors representing emojis in the global emoji embedding space in accordance with some aspects of the present technology.

In step 502, training data may be received. In some cases, the emoji recommendation service 128, the data analytics service 118, and/or the servers/guilds service 124 illustrated in FIG. 1 may receive the training data. The training data may include sequences of emojis used by each user of an online community in a period of time, and emoji identifications, timestamps of previous usage of respective emojis, and user identifications associated with each emoji.

In step 504, a machine learning algorithm may be trained to arrange the vectors in an embedding space. For example, the emoji recommendation service 128, the data analytics service 118, and/or the servers/guilds service 124 illustrated in FIG. 1 may train a machine learning algorithm configured to arrange the vectors. In some embodiments, the machine learning algorithm can be an unsupervised machine learning algorithm. In some embodiments, the machine learning algorithm for arranging the vectors in the embedding space can be a supervised machine learning model. The machine learning algorithm can be more than one machine learning algorithm. The machine learning algorithm may be trained using a supervised process that encourages correct predictions of vectors representing emojis in the embedding space. The vectors representing emojis in the embedding space may be based on the past emoji usage includes sequences of emojis used in a period of time and respective timestamps, and wherein each sequence of emojis associated with a respective user.

In step 506, the global emoji embeddings may be generated from the arranged vectors representing past emoji usage by users of the online community. As such the trained machine learning algorithm may generate global emoji embeddings for different online communities based on a set of sequence of emojis used by the users of the online community. As previously mentioned, the global emoji embeddings may be a mathematical representation with a certain dimension, such as 50-dimensional vectors, to represent which emojis the users of the online community have been using over a period of time. In step 508, the user embeddings may be generated from the global emoji embeddings. For example, the emoji recommendation service 128, the data analytics service 118, and/or the servers/guilds service 124 illustrated in FIG. 1 may generate the global emoji embeddings using the trained machine learning algorithm and the user embeddings from the global emoji embeddings.

Figure 6:
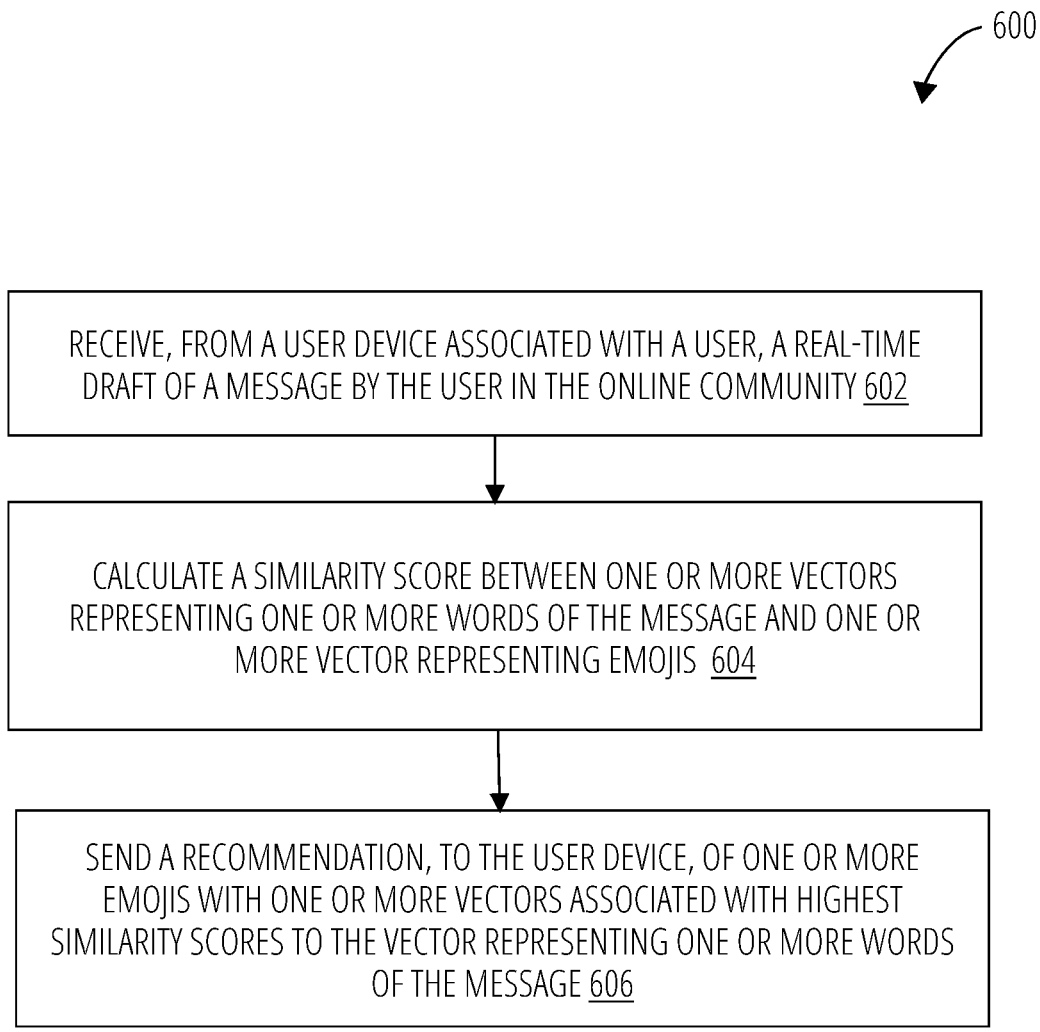
FIG. 6 illustrates an example method for sending a recommendation of an emoji based on one or more words of a draft message by a user in the online community in accordance with some aspects of the present technology.

FIG. 6 illustrates an example method 600 for sending a recommendation of an emoji based on one or more words of a draft message by a user in the online community in accordance with one embodiment.

In step 602, a real-time draft of a message by the user in the online community may be received from a user device associated with a user. The real-time draft message may include a plurality of words. One or more words may be determined to be key words of the real-time draft message. For example, words like "a" and "the" would not be considered key words.

In step 604, a similarity score may be calculated between one or more vectors representing the one or more key words of the message and one or more vector representing emojis. Vectors representing words may be given the same dimensions and a word embedding space may include, for example 50-dimensional vectors representing words.

In step 606, a recommendation may be sent to the user device. The recommendation may include one or more emojis with one or more vectors associated with highest similarity scores to the vector representing one or more key words of the message. As such, the user may be provided emoji recommendations that are relevant to the context of the message. These emoji recommendations may be provided in tandem with the emoji recommendations from the final ranking. In some cases, recommended emojis may include a set of emojis that the user has just used, a set of top emojis based on the final ranking, and a set of emojis that dynamically change based on the context of the message. The user may then select, at any point of typing a message, which emoji they want to use.

Figure 7:
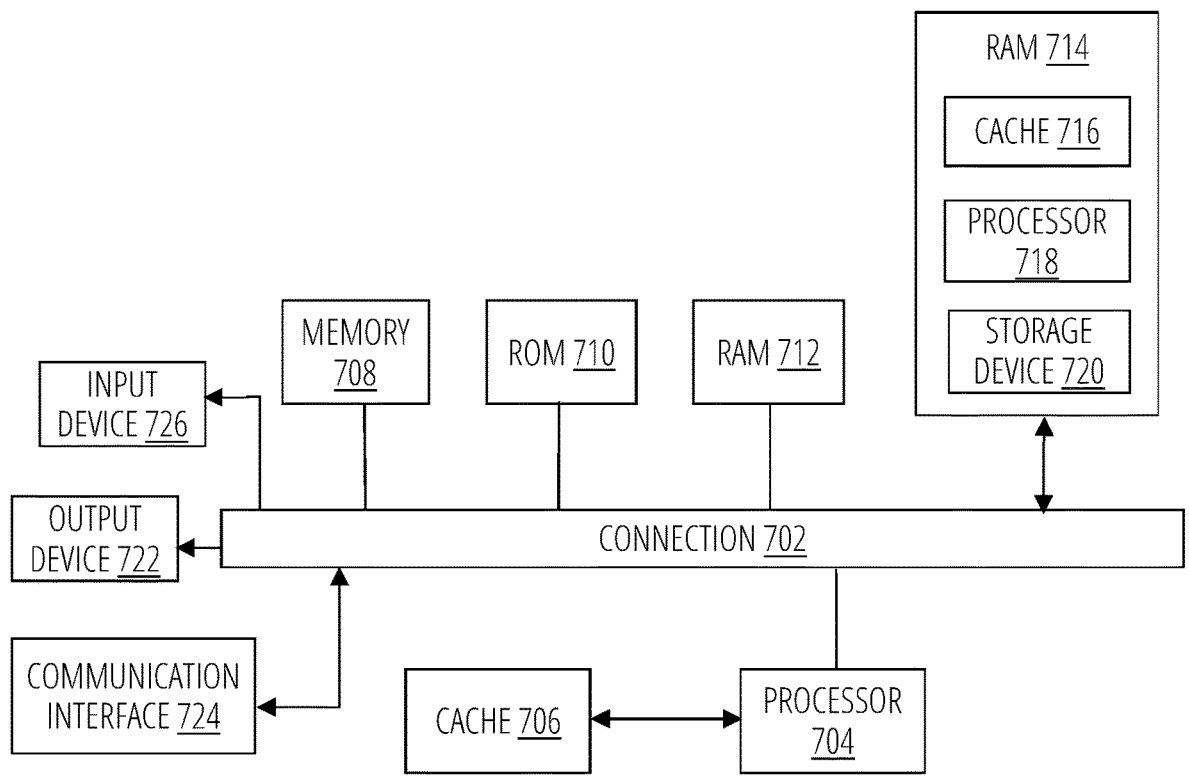
FIG. 7 illustrates an example of a computing system for implementing some aspects of the present technology.

FIG. 7 shows an example of computing system 700, which can be for example any computing device making up client application 104, community hosting service 102, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, services 718, and services 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

Figure 8:
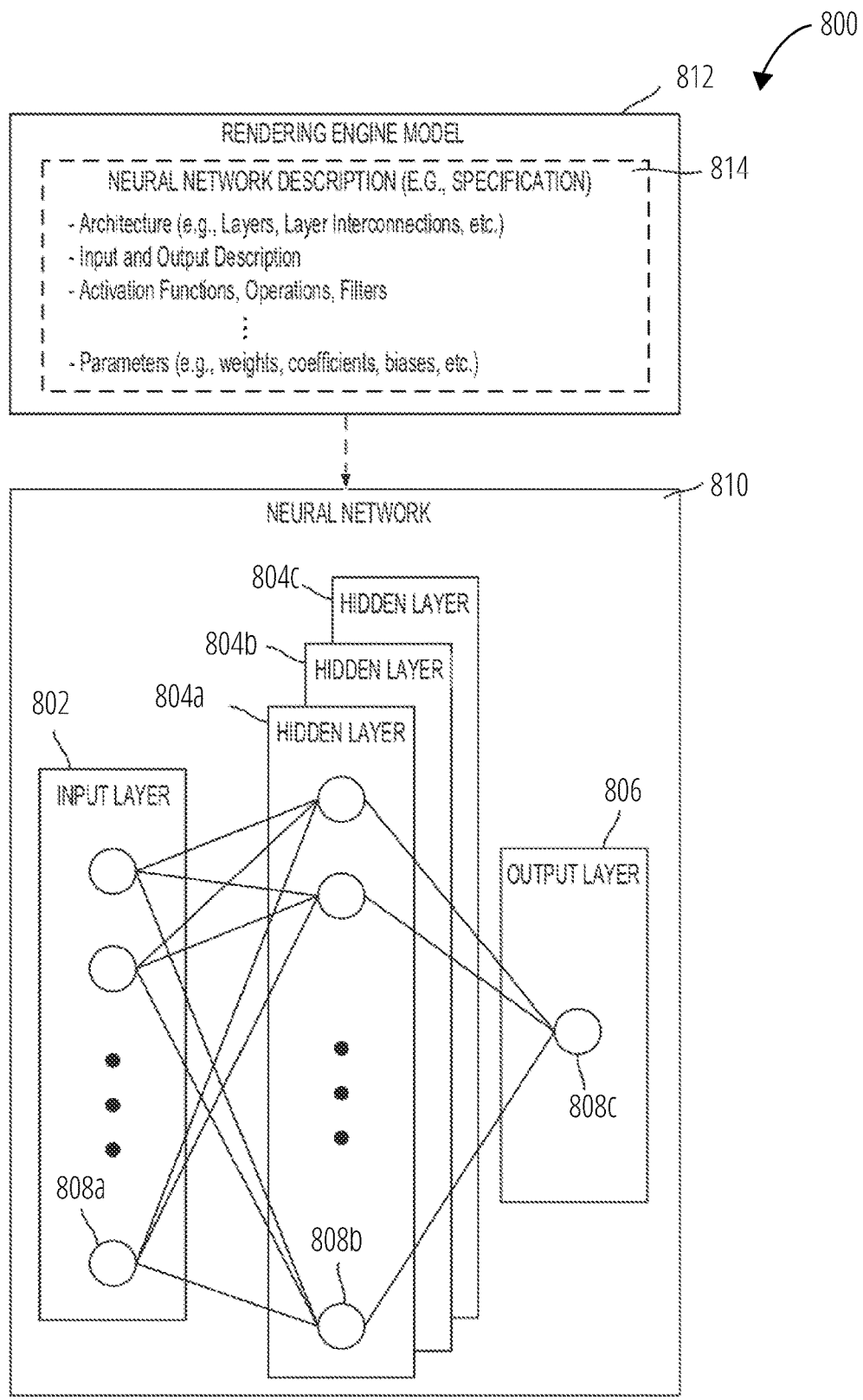
FIG. 8 illustrates an example neural network architecture, according to some aspects of the present technology.

FIG. 8 illustrates an example neural network architecture 800, according to one aspect of the present disclosure. Neural network architecture 800 includes a neural network 810 defined by an example neural network description in rendering engine model 812 (or (neural controller). The neural network 810 can represent a neural network implementation of a rendering engine for rendering media data. The neural network description 814 can include a full specification of the neural network 810, including the neural network architecture 800. For example, the neural network description 802 can include a description or specification of the neural network architecture 800 of the neural network 810 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 810 reflects the neural network architecture 800 defined in the neural network description 802. In this example, the neural network 810 includes an input layer 802, which includes input data, such as sequences of emojis used by each user of an online community in a period of time, and emoji identifications, timestamps of previous usage of respective emojis, and user identifications associated with each emoji. In one illustrative example, the input layer 802 can include data representing sequences of emojis used by each user of an online community in a period of time, and emoji identifications, timestamps of previous usage of respective emojis, and user identifications associated with each emoji.

The input layer 802 includes hidden layer 804a, hidden layer 804b, through hidden layer 804n (collectively "804" hereinafter). The hidden layers 804 can include n number of hidden layers, where n is an integer greater than or equal to one. The number of hidden layers can include as many layers as needed for a desired processing outcome and/or rendering intent. The neural network 810 further includes an output layer 806 that provides an output (e.g., vectors representing emojis in an embedding space) resulting from the processing performed by the hidden layers 804. In one illustrative example, the output layer 806 can provide vectors representing emojis in an embedding space.

The neural network 810 in this example is a multi-layer neural network of interconnected nodes. Each node can represent a piece of information. Information associated with the nodes is shared among the different layers and each layer retains information as information is processed. In some cases, the neural network 810 can include a feed-forward neural network, in which case there are no feedback connections where outputs of the neural network are fed back into itself. In other cases, the neural network 810 can include a recurrent neural network, which can have loops that allow information to be carried across nodes while reading in input.

Information can be exchanged between nodes through node-to-node interconnections between the various layers. Nodes of the input layer 802 can activate a set of nodes in the first hidden layer 804a. For example, as shown, each of the input nodes of the input layer 102 is connected to each of the nodes of the first hidden layer 804a. The nodes of the hidden layer 804a can transform the information of each input node by applying activation functions to the information. The information derived from the transformation can then be passed to and can activate the nodes of the next hidden layer (e.g., 804b), which can perform their own designated functions. Example functions include convolutional, up-sampling, data transformation, pooling, and/or any other suitable functions. The output of the hidden layer (e.g., 804b) can then activate nodes of the next hidden layer (e.g., 804n), and so on. The output of the last hidden layer can activate one or more nodes of the output layer 806, at which point an output is provided. In some cases, while nodes (e.g., node 808a, node 808b, node 808c) in the neural network 810 are shown as having multiple output lines, a node has a single output and all lines shown as being output from a node represent the same output value.

In some cases, each node or interconnection between nodes can have a weight that is a set of parameters derived from training the neural network 810. For example, an interconnection between nodes can represent a piece of information learned about the interconnected nodes. The interconnection can have a numeric weight that can be tuned (e.g., based on a training dataset), allowing the neural network 810 to be adaptive to inputs and able to learn as more data is processed.

The neural network 810 can be pre-trained to process the features from the data in the input layer 802 using the different hidden layers 804 in order to provide the output through the output layer 806. In an example in which the neural network 810 is used to generate vectors representing emojis in an embedding space, the neural network 810 can be trained using training data that includes example sequences of emojis used by each user of an online community in a period of time, and emoji identifications, timestamps of previous usage of respective emojis, and user identifications associated with each emoji. For instance, training images can be input into the neural network 810, which can be processed by the neural network 810 to generate outputs which can be used to tune one or more aspects of the neural network 810, such as weights, biases, etc.

In some cases, the neural network 810 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 810, the output can include values that do not give preference to any particular class due to the weights being randomly selected at initialization. For example, if the output is a vector with probabilities that the object includes different product(s) and/or different users, the probability value for each of the different product and/or user may be equal or at least very similar. With the initial weights, the neural network 810 is unable to determine low level features and thus cannot make an accurate determination of what the classification of the object might be. A loss function can be used to analyze errors in the output. Any suitable loss function definition can be used.

The loss (or error) can be high for the first training dataset (e.g., sequences of emojis used by each user of an online community in a period of time, and emoji identifications, timestamps of previous usage of respective emojis, and user identifications associated with each emoji) since the actual values will be different than the predicted output. The goal of training is to minimize the amount of loss so that the predicted output comports with a target or ideal output. The neural network 810 can perform a backward pass by determining which inputs (weights) most contributed to the loss of the neural network 810, and can adjust the weights so that the loss decreases and is eventually minimized.

A derivative of the loss with respect to the weights can be computed to determine the weights that contributed most to the loss of the neural network 810. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 110 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 110 can represent any other neural or deep learning network, such as an autoencoder, a deep belief nets (DBNs), a recurrent neural networks (RNNs), etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A computer-implemented method comprising: creating emoji embeddings in an embedding space, the emoji embeddings comprising vectors representing past emoji usage by users in an online community over a period of time; creating user embeddings from the emoji embeddings, wherein the user embeddings represent past emoji usage by a user in the online community over the period of time; measuring a similarity score between the emoji embeddings and the user embeddings; and generating a first ranking of top emojis based on the measured similarity scores for the user.

Aspect 2. The computer-implemented method of Aspect 1, wherein the creating the user embedding from the emoji embeddings further comprises calculating a weighted average based on frequency of use of emojis over a period of time for the user, and the weighted average translates the emoji embeddings to form the user embeddings.

Aspect 3. The computer-implemented method of any of Aspects 1 to 2, wherein the similarity score is calculated using cosine similarity, wherein a higher similarity score indicates a higher ranking in the ranking of top emojis.

Aspect 4. The computer-implemented method of any of Aspects 1 to 3, further comprising: training a machine learning algorithm comprising a dataset including sequences of emojis used by each user in a period of time, and emoji identifications, timestamps of previous usage of respective emojis, and user identifications associated with each emoji, wherein the machine learning algorithm is trained using a supervised process that encourages correct predictions of vectors representing emojis in the embedding space.

Aspect 5. The computer-implemented method of any of Aspects 1 to 4, further comprising: generating a different ranking of top emojis for a different user based on different user embeddings associated with the different user.

Aspect 6. The computer-implemented method of any of Aspects 1 to 5, further comprising: generating a different ranking of top emojis for the user in a different online community based on different emoji embeddings associated with the different online community.

Aspect 7. The computer-implemented method of any of Aspects 1 to 6, wherein the online community is a server of a plurality of servers of a community hosting service, wherein a same user in different servers is recommended different emojis.

Aspect 8. The computer-implemented method of any of Aspects 1 to 7, further comprising: receiving, from a client device associated with the user, a request to add an emoji; and sending the ranked top emojis or respective emoji identifiers to the client device.

Aspect 9. The computer-implemented method of any of Aspects 1 to 8, further comprising: determining term frequency-inverse document frequency (tf-idf) scores of emojis used by the user and other users in the online community; and determining a second ranking of top emojis based on the tf-idf scores, wherein a fin ranking is based on an average of the first ranking and the second ranking.

Aspect 10. The computer-implemented method of any of Aspects 1 to 9, wherein each tf-idf score is calculated as a product of a term frequency calculation, which takes a log of a number users that send a specific emoji divided by a total number of users that send any emoji in the online community over the period of time, and a user inverse document frequency calculation, which takes a log of a total number of times of any emojis is sent by the user divided by a number of the times the specific emoji is sent by the user over the period of time.

Aspect 11. The computer-implemented method of any of Aspects 1 to 10, further comprising: replacing one or more Unicode emojis from the ranking of top emojis with custom emojis associated with the online community with emoji embeddings with a highest similarity score when calculated based on the respective one or more Unicode emojis.

Aspect 12. The computer-implemented method of any of Aspects 1 to 11, further comprising: receiving, from a user device associated with a user, a real-time draft of a message by the user in the online community; calculating a similarity score between one or more vectors representing one or more words of the message and one or more vector representing emojis from a second embedding space; and to the user device, of an emoji with a vector associated with a highest similarity score to the vector representing one or more words of the message.

Aspect 13. A non-transitory computer-readable storage medium, the computer-readable storage medium including instructions that when executed by a computer, cause the computer to: create emoji embeddings in an embedding space, the emoji embeddings comprising vectors representing past emoji usage by users in an online community over a period of time; create user embeddings from the emoji embeddings, wherein the user embeddings represent past emoji usage by a user in the online community over the period of time; measure a similarity score between the emoji embeddings and the user embeddings; and generate a ranking of top emojis based on the measured similarity scores for the user.

Aspect 14. The non-transitory computer-readable storage medium of Aspect 13, wherein the creating the user embeddings from the emoji embeddings further comprises calculating a weighted average based on frequency of use of emojis over a period of time for the user, and the weighted average translates the emoji embeddings to form the user embeddings.

Aspect 15. The non-transitory computer-readable storage medium of any of Aspects 13 to 14, wherein the similarity score is calculated using cosine similarity, wherein a higher similarity score indicates a higher rank in the ranking of top emojis.

Aspect 16. The non-transitory computer-readable storage medium of any of Aspects 13 to 15, wherein the instructions further configure the computer to: train a machine learning algorithm comprising a dataset including sequences of emojis used by each user in a period of time, and emoji identifications, timestamps of previous usage of respective emojis, and user identifications associated with each emoji, wherein the machine learning algorithm is trained using a supervised process that encourages correct predictions of vectors representing emojis in the embedding space.

Aspect 17. The non-transitory computer-readable storage medium of any of Aspects 13 to 16, wherein the instructions further configure the computer to: generate a different ranking of top emojis for a different user based on different user embeddings associated with the different user.

Aspect 18. The non-transitory computer-readable storage medium of any of Aspects 13 to 17, wherein the instructions further configure the computer to: generate a different ranking of top emojis for the user in a different online community based on different emoji embeddings associated with the different online community.

Aspect 19. A system comprising: a processor; and when executed by the processor, configure the system to: create emoji embeddings in an embedding space, the emoji embeddings comprising vectors representing past emoji usage by users in an online community over a period of time; create user embeddings from the emoji embeddings, wherein the user embeddings represent past emoji usage by a user in the online community over the period of time; measure a similarity score between the emoji embeddings and the user embeddings; and generate a ranking of top emojis based on the measured similarity scores for the user.

Aspect 20. The system of Aspect 19, wherein the creating the user embeddings from the emoji embeddings further comprises calculating a weighted average based on frequency of use of emojis over a period of time for the user, and the weighted average translates the emoji embeddings to form the user embeddings.

What is claimed is:

1. A computer-implemented method comprising:
creating sets of community emoji embeddings in respective embedding spaces, the sets of community emoji embeddings comprising respective vectors representing respective past emoji usage by respective users in respective online communities of a community hosting service;
creating different sets of user embeddings for a same user in the respective online communities based on transforming the respective set of community emoji embeddings into the respective set of user embeddings by shifting the respective vectors of the respective set of community emoji embeddings based on respective past emoji usage by the same user in the respective online communities, wherein the different sets of user embeddings represent the respective different past emoji usage by the same user and different past emoji usage in the respective online communities;
measuring similarity scores between the respective sets of community emoji embeddings and the different sets of user embeddings; and
generating different rankings of top emojis based on the measured similarity scores for the same user for the respective online communities.

2. The computer-implemented method of claim 1, wherein the creating the different sets of user embeddings from the respective sets of community emoji embeddings further comprises calculating a respective weighted average based on frequency of use of emojis over a period of time for the same user, and the weighted average translates the respective set of community emoji embeddings to form the different sets of user embeddings.

3. The computer-implemented method of claim 1, wherein the similarity score is calculated using cosine similarity, wherein a higher similarity score indicates a higher ranking in the ranking of top emojis.

4. The computer-implemented method of claim 1, further comprising:
training a machine learning algorithm comprising a dataset including sequences of emojis used by each user in a period of time, and emoji identifications, timestamps of previous usage of respective emojis, and user identifications associated with each emoji, wherein the machine learning algorithm is trained using a supervised process that encourages correct predictions of vectors representing emojis in the respective embedding space.

5. The computer-implemented method of claim 1, further comprising:
generating a different ranking of top emojis for a different user based on different user embeddings associated with the different user.

6. The computer-implemented method of claim 1, further comprising:
generating a different ranking of top emojis for the user in a different online community based on different community emoji embeddings associated with the different online community.

7. The computer-implemented method of claim 1, wherein the online community is a server of a plurality of servers of the community hosting service, wherein a same user in different servers is recommended different emojis.

8. The computer-implemented method of claim 1, further comprising:
receiving, from a client device associated with the user, a request to add an emoji; and
sending the ranked top emojis or respective emoji identifiers to the client device.

9. The computer-implemented method of claim 1, further comprising:
determining term frequency-inverse document frequency (tf-idf) scores of emojis used by the user and other users in the online community; and
determining a second ranking of top emojis based on the tf-idf scores, wherein a final ranking is based on an average of the first ranking and the second ranking.

10. The computer-implemented method of claim 9, wherein each tf-idf score is calculated as a product of a term frequency calculation, which takes a log of a number users that send a specific emoji divided by a total number of users that send any emoji in the respective online community over the period of time, and a user inverse document frequency calculation, which takes a log of a total number of times of any emojis is sent by the user divided by a number of the times the specific emoji is sent by the user over the period of time.

11. The computer-implemented method of claim 1, further comprising:
replacing one or more Unicode emojis from the ranking of top emojis with custom emojis associated with the online community with emoji embeddings with a highest similarity score when calculated based on the respective one or more Unicode emojis.

12. The computer-implemented method of claim 1, further comprising:
receiving, from a user device associated with a user, a real-time draft of a message by the user in the online community;
calculating a similarity score between one or more vectors representing one or more words of the message and one or more vector representing emojis from a second embedding space; and
sending a recommendation, to the user device, of an emoji with a vector associated with a highest similarity score to the vector representing one or more words of the message.

13. A non-transitory computer-readable storage medium, the computer-readable storage medium including instructions that when executed by a computer, cause the computer to:

create sets of community emoji embeddings in respective embedding spaces, the sets of community emoji embeddings comprising respective vectors representing respective past emoji usage by respective users in a respective server of a plurality of servers of a community hosting service;

create different user embeddings for a same user in the different servers based on shifting the respective vectors of the respective community emoji embeddings based on respective past emoji usage by the same user in the respective servers, wherein the different user embeddings represent the respective past emoji usage by the same user in the respective servers;

measure similarity scores between the respective community emoji embeddings and the different user embeddings; and generate different rankings of top emojis based on the measured similarity scores for the same user for the respective servers.

14. The non-transitory computer-readable storage medium of claim 13, wherein the creating the user embeddings from the community emoji embeddings further comprises calculating a weighted average based on frequency of use of emojis over a period of time for the user, and the weighted average translates the community emoji embeddings to form the user embeddings.

15. The non-transitory computer-readable storage medium of claim 13, wherein the similarity score is calculated using cosine similarity, wherein a higher similarity score indicates a higher rank in the ranking of top emojis.

16. The non-transitory computer-readable storage medium of claim 13, wherein the instructions further configure the computer to:

train a machine learning algorithm comprising a dataset including sequences of emojis used by each user in a period of time, and emoji identifications, timestamps of previous usage of respective emojis, and user identifications associated with each emoji, wherein the machine learning algorithm is trained using a supervised process that encourages correct predictions of vectors representing emojis in the embedding space.

17. The non-transitory computer-readable storage medium of claim 13, wherein the instructions further configure the computer to:

generate a different ranking of top emojis for a different user based on different user embeddings associated with the different user.

18. The non-transitory computer-readable storage medium of claim 13, wherein the instructions further configure the computer to:

generate a different ranking of top emojis for the user in a different online community based on different emoji embeddings associated with the different online community.

19. A system comprising:
one or more processors; and
a memory storing instructions that, when executed by the one or more processors, configure the system to:
create a set of community emoji embeddings in an embedding space, the set of community emoji embeddings comprising vectors representing past emoji usage by users in an online community over a period of time;
create a set of user embeddings of a user, based on transforming the set of community emoji embeddings into the set of user embeddings, by shifting the vectors of the set of community emoji embeddings based on respective past emoji usage by the user, wherein the set of user embeddings represent the past emoji usage by the user and past emoji usage by other users in the online community over the period of time;
measure a similarity score between the set of community emoji embeddings and the set of user embeddings; and
generate a ranking of top emojis based on the measured similarity scores for the user.

20. The system of claim 19, wherein the creating the user embeddings from the set of community emoji embeddings further comprises calculating a weighted average based on frequency of use of emojis over a period of time for the user, and the weighted average translates the set of community emoji embeddings to form the set of user embeddings.

* * * * *